US010182232B2

(12) United States Patent
Kouno et al.

(10) Patent No.: US 10,182,232 B2
(45) Date of Patent: Jan. 15, 2019

(54) INFORMATION PROCESSING APPARATUS, INFORMATION PROCESSING SYSTEM AND INFORMATION PROCESSING METHOD

(71) Applicant: SONY CORPORATION, Tokyo (JP)

(72) Inventors: Masakazu Kouno, Tokyo (JP); Yuji Ando, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 582 days.

(21) Appl. No.: 14/645,603

(22) Filed: Mar. 12, 2015

(65) Prior Publication Data

US 2015/0271500 A1 Sep. 24, 2015

(30) Foreign Application Priority Data

Mar. 24, 2014 (JP) .................................. 2014-060755

(51) Int. Cl.
H04N 19/136 (2014.01)
H04N 19/517 (2014.01)
H04N 19/463 (2014.01)
H04N 19/12 (2014.01)
H04N 19/154 (2014.01)
H04N 19/17 (2014.01)
H04N 19/30 (2014.01)

(52) U.S. Cl.
CPC ........... *H04N 19/12* (2014.11); *H04N 19/154* (2014.11); *H04N 19/17* (2014.11); *H04N 19/395* (2014.11)

(58) Field of Classification Search
None
See application file for complete search history.

(56) References Cited

U.S. PATENT DOCUMENTS

| 2006/0045179 A1* | 3/2006 | Mizuno | G11B 20/00086 375/240.01 |
| 2011/0013692 A1* | 1/2011 | Cohen | H04N 19/139 375/240.02 |
| 2013/0276046 A1* | 10/2013 | Park | H04N 21/4302 725/110 |
| 2013/0307924 A1* | 11/2013 | Cho | H04N 13/0051 348/43 |

FOREIGN PATENT DOCUMENTS

JP 2008-072591 A 3/2008

OTHER PUBLICATIONS

Xing et al. ("A Coding Unit Classification Based AVC-To_HEVC Transcoding with Background Modeling for Surveillance Videos" IEE Visual communications and Image processing 2013).*

* cited by examiner

*Primary Examiner* — Kate H Luo
(74) *Attorney, Agent, or Firm* — Chip Law Group

(57) ABSTRACT

An information processing apparatus includes: a storage unit configured to store information on a plurality of encoders; and a control unit configured to be capable of transmitting a first instruction signal for instructing the plurality of encoders to encode input video data under first encoding conditions different for each of the plurality of encoders, and obtaining, if an image quality of the video data encoded by the plurality of encoders does not satisfy a predetermined criteria, predetermined information associated with the image quality from the encoded video data and transmitting, based on the predetermined information, a second instruction signal for instructing to encode the input video data under a second encoding condition different from the first encoding conditions to at least one encoder of the plurality of encoders.

9 Claims, 6 Drawing Sheets

| Apparatus | Encoder | CPU | Memory |
|---|---|---|---|
| Apparatus A (High Spec) | H/W HEVC | 3.8GHz | 16GByte |
| Apparatus B (Low Spec) | H/W MPEG2 | 2.2GHz | 8GByte |
| Apparatus C (Middle Spec) | H/W AVC | 2.8GHz | 12GByte |
| ⋮ | ⋮ | | |

FIG.4

INFORMATION PROCESSING APPARATUS, INFORMATION PROCESSING SYSTEM AND INFORMATION PROCESSING METHOD

CROSS REFERENCE TO RELATED APPLICATIONS

This application claims the benefit of Japanese Priority Patent Application JP 2014-060755 filed Mar. 24, 2014, the entire contents of which are incorporated herein by reference.

BACKGROUND

The present technology relates to an information processing apparatus capable of encoding a moving image, to an information processing system including the information processing apparatus, and to an information processing method and a program for the information processing apparatus.

With the development of broadband technology in recent years, the number of users who utilize a distribution service of moving image content via a network has been increasing year by year. Such moving image content is created by authoring. This work is conducted mainly by an authoring studio. The authoring studio compresses audio and video and combines the compressed audio and video into a single content product (authoring).

A video compression tool used in this authoring process is called authoring video encoder. The authoring video encoder has to meet a particular need of the studio unlike a general video encoder. For example, regarding the image quality, uniformity of the image quality in temporal and spatial directions is regarded as important and a movie producer or the like has an obsession with noise expression and the like even in regions which ordinary people does not care about.

In addition, for a codec of the video encoder, a AVC (MPEG4 advanced video coding/H.264) or HEVC (ISO/IEC 23008-2 high efficiency video coding/H.265) having a high encoding efficiency is used. These codecs include many tool for increasing the encoding efficiency and the tools are dependent on one another. Therefore, it is difficult to predict an encoding result (image quality).

Thus, for realizing the studio-level image quality, it is necessary to determine a combination of encoding tools by trial and error and perform encoding again and again. Specifically, for the encoding processing, a so-called multi-pass encoding method is used. Japanese Patent Application Laid-open No. 2008-072591 (hereinafter, referred to as Patent Document 1) has disclosed an encoding apparatus using a multi-pass encoding method.

SUMMARY

In the multi-pass encoding method, encoding processing in a first pass is carried out for obtaining information on an actually generated code amount for each scene, a motion vector, and a mode.

Regarding encoding processing in a second pass, for the purpose of obtaining a uniform image quality, a bit rate is allocated for each scene and encoding processing is carried out. Specifically, for increasing the speed, the information (motion vector or mode) obtained in the first pass is used and processing of motion estimation (ME)/mode decision (MD) is simplified while ensuring the image quality.

Regarding the subsequent pass (N-th pass), a bit rate higher than that in the second pass is allocated to a scene or region in which the uniform image quality has not been obtained by the encoding processing in the second pass, and encoding processing is carried out.

That is, in the multi-pass encoding method as described in Patent Document 1 above, the above-mentioned processes need to be performed, and hence there is a problem in that a calculation amount increases and the encoding time is too long.

In view of the above-mentioned circumstances, it is desirable to provide an information processing apparatus, an information processing system, an information processing method, and a program, by which the speed of multi-pass encoding processing can be increased.

According to an embodiment of the present technology, there is provided an information processing apparatus including a storage unit and a control unit. The storage unit is configured to store information on a plurality of encoders. The control unit is configured to be capable of transmitting a first instruction signal for instructing the plurality of encoders to encode input video data under first encoding conditions different for each of the plurality of encoders. The control unit is configured to be capable of obtaining, if an image quality of the video data encoded by the plurality of encoders does not satisfy a predetermined criteria, predetermined information associated with the image quality from the encoded video data and transmitting, based on the predetermined information, a second instruction signal for instructing to encode the input video data under a second encoding condition different from the first encoding conditions to at least one encoder of the plurality of encoders.

With this, by causing the plurality of encoders to perform encoding processing in a first pass in multi-pass encoding processing, the information processing apparatus can increase the speed of the multi-pass encoding processing.

The plurality of encoders may be provided in a plurality of apparatuses in a network. In this case, the information processing apparatus may further include a communication unit capable of transmitting the first instruction signal to the encoder of each of the plurality of apparatuses.

With this, by using the encoder provided in each apparatus in the network, the information processing apparatus can reduce the load necessary for encoding processing and increase the speed of the encoding processing.

The plurality of apparatuses may have different arithmetic processing capabilities. In this case, the control unit may be configured to control the communication unit to transmit the first instruction signal for instructing to perform encoding under an encoding condition having a first calculation amount out of the first encoding conditions to a first apparatus having a first arithmetic processing capability. Further, the control unit may be configured to control the communication unit to transmit the first instruction signal for instructing to perform encoding under an encoding condition having a second calculation amount smaller than the first calculation amount out of the first encoding conditions to a second apparatus having a second arithmetic processing capability lower than the first arithmetic processing capability.

With this, the information processing apparatus can efficiently instruct the apparatuses having the different arithmetic processing capabilities to perform encoding processing under the encoding conditions different in calculation amount.

The control unit may be configured to set encoding using different first encoding parameters by a first encoding method having a first encoding efficiency as the first encoding conditions. Further, the control unit may be configured to set, based on the predetermined information obtained by the encoding by the first encoding method, encoding using a second encoding parameter by a second encoding method having a second encoding efficiency higher than the first encoding efficiency as the second encoding condition.

With this, by effectively using the information obtained by the encoding using the first encoding parameter by the encoding method in the first pass and setting, in a second pass, the encoding parameter of the encoding method different from that in the first pass, the information processing apparatus can increase the efficiency and speed of the encoding processing. Here, the first encoding method is, for example, an MPEG or an AVC and the second encoding method is, for example, the AVC or an HEVC. However, the first and second encoding methods are not limited thereto. The encoding parameter is, for example, a motion vector search range, a discrete cosine transform (DCT) size, an intra-prediction range, or an inter-mode type. However, the encoding parameter is not limited thereto.

The control unit may be configured to set the first encoding conditions such that a plurality of regions in each frame of the input video data are encoded by different encoders and to transmit the first instruction signal.

With this, by causing encoders different for each of different regions of each frame to perform encoding, the information processing apparatus can reduce the processing time necessary for the encoding. This processing may be used for encoding processing of 4K video. In this case, the number of regions are four, for example.

The input video data may be video data obtained by decoding video data encoded by a first encoding method having a first encoding efficiency. In this case, the control unit may be configured to set, based on the predetermined information obtained from the video data encoded by the first encoding method, encoding parameters of a second encoding method different from the first encoding method as the first encoding conditions, the encoding parameters being different for each of the encoders.

With this, the information processing apparatus can efficiently remake video data, which has been encoded by an encoding method having a low encoding efficiency, by an encoding method having a higher encoding efficiency.

According to another embodiment of the present technology, there is provided an information processing system including a plurality of apparatuses and an information processing apparatus. The plurality of apparatuses each include an encoder. The information processing apparatus includes a storage unit and a control unit. The storage unit is configured to store information on the encoder. The control unit is configured to be capable of transmitting a first instruction signal for instructing the plurality of encoders to encode input video data under first encoding conditions different for each of the plurality of encoders. Further, the control unit is configured to be capable of obtaining, if an image quality of the video data encoded by the plurality of encoders does not satisfy a predetermined criteria, predetermined information associated with the image quality from the encoded video data and transmitting, based on the predetermined information, a second instruction signal for instructing to encode the input video data under a second encoding condition different from the first encoding conditions to at least one encoder of the plurality of encoders.

According to still another embodiment of the present technology, there is provided an information processing method including: transmitting a first instruction signal for instructing the plurality of encoders to encode input video data under first encoding conditions different for each of the plurality of encoders; obtaining, if an image quality of the video data encoded by the plurality of encoders does not satisfy a predetermined criteria, predetermined information associated with the image quality from the encoded video data; and transmitting, based on the predetermined information, a second instruction signal for instructing to encode the input video data under a second encoding condition different from the first encoding conditions to at least one encoder of the plurality of encoders.

According to still another embodiment of the present technology, there is provided a program that causes an information processing apparatus to execute the steps of: transmitting a first instruction signal for instructing the plurality of encoders to encode input video data under first encoding conditions different for each of the plurality of encoders; obtaining, if an image quality of the video data encoded by the plurality of encoders does not satisfy a predetermined criteria, predetermined information associated with the image quality from the encoded video data; and transmitting, based on the predetermined information, a second instruction signal for instructing to encode the input video data under a second encoding condition different from the first encoding conditions to at least one encoder of the plurality of encoders.

As described above, according to the embodiments of the present technology, it is possible to increase the speed of multi-pass encoding processing. However, this effect does not limit the present technology.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 4 is a diagram showing a configuration of a database of the encoding controller;

DETAILED DESCRIPTION OF EMBODIMENTS

Hereinafter, an embodiment of the present technology will be described with reference to the drawings.

[Outline of System]

Figure 1:
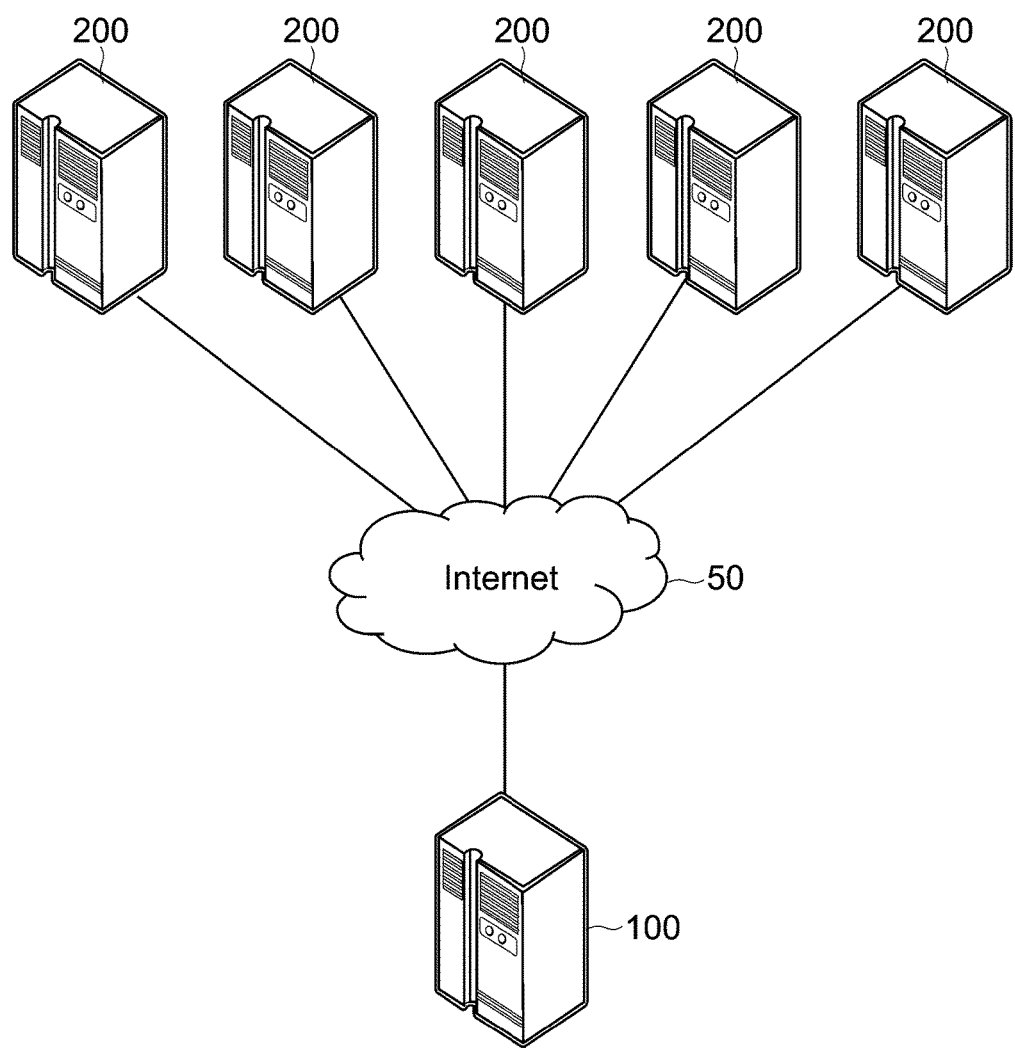
FIG. 1 is a diagram showing an outline of an authoring encoding system according to an embodiment of the present technology.

FIG. 1 is a diagram showing a configuration of an authoring encoding system according to an embodiment of the present technology.

As shown in the figure, this system includes an encoding controller 100 and a plurality of encoding apparatuses 200 in a cloud (e.g., Internet 50). The encoding controller 100 and each encoding apparatus 200 are communicable with each other via the Internet 50.

Each encoding apparatus 200 incorporates an encoder. The encoding apparatuses 200 can have different arithmetic processing capabilities.

The encoding controller 100 is placed in, for example, an authoring studio that provides authoring services of moving image content. The encoding controller 100 is capable of controlling execution of authoring encoding processing, using the plurality of encoding apparatuses 200 at the same time.

In the figure, five encoding apparatuses 200 are shown. However, the number of encoding apparatuses 200 is not limited thereto and four or less or six or more encoding apparatuses 200 may be provided.

[Hardware Configuration of Encoding Controller]

Figure 2:
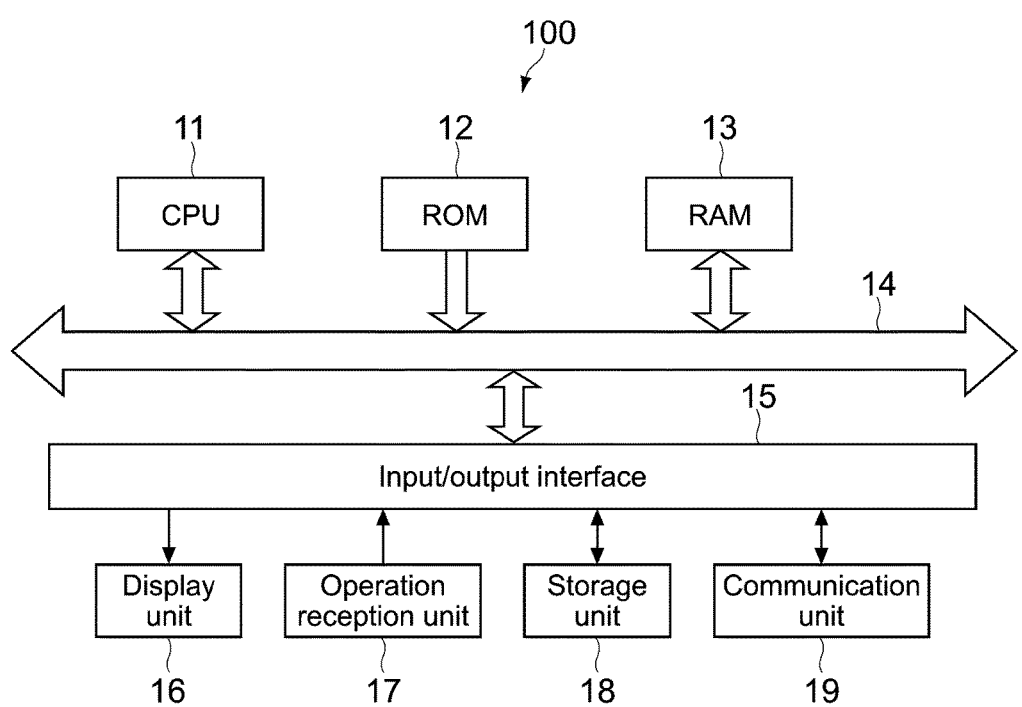
FIG. 2 is a block diagram showing a configuration of a hardware configuration of an encoding controller in the authoring encoding system.

FIG. 2 is a diagram showing a hardware configuration of the encoding controller 100. As shown in the figure, the encoding controller 100 includes a central processing unit (CPU) 11, a read only memory (ROM) 12, a random access memory (RAM) 13, an input/output interface 15, and a bus 14 that connects them to one another.

The CPU 11 accesses the RAM 13 and the like depending on needs and generally controls all the blocks of the encoding controller 100 while performing various arithmetic processing. The ROM 12 is a non-volatile memory in which an OS executed by the CPU 11 and firmware such as programs and various parameters are fixedly stored. The RAM 13 is used as a working area or the like of the CPU 11 and temporarily retains the OS, various application being executed, and various types of data being processed.

To the input/output interface 15, connected are a display unit 16, an operation reception unit 17, a storage unit 18, a communication unit 19, and the like.

The display unit 16 is a display device using a liquid crystal display (LCD), an organic electroluminescence display (OELD), or a cathode ray tube (CRT), for example.

The operation reception unit 17 is a pointing device, for example, a mouse, a keyboard, a touch panel, and another input apparatus. If the operation reception unit 17 is a touch panel, the touch panel can be integrated with the display unit 16.

The storage unit 18 is a non-volatile memory, for example, a hard disk drive (HDD), a flash memory (SSD; solid state drive), or another solid-state memory. The storage unit 18 stores the above-mentioned OS, various applications, and various types of data.

Although described later, in particular in this embodiment, the storage unit 18 stores information on the arithmetic processing capabilities (specs) of the encoding apparatuses 200 and the encoders incorporated in the encoding apparatuses 200. The storage unit 18 also stores programs and data necessary for the authoring encoding processing using the encoding apparatuses 200.

The communication unit 19 is, for example, a network interface card (NIC) for Ethernet (registered trademark) and serves to perform communication processing with respect to the encoding apparatuses 200 in the Internet 50.

Although not shown in the figure, a hardware configuration of the encoding apparatus 200 is the same as that of the encoding controller 100.

[Specific Example of System]

Figure 3:
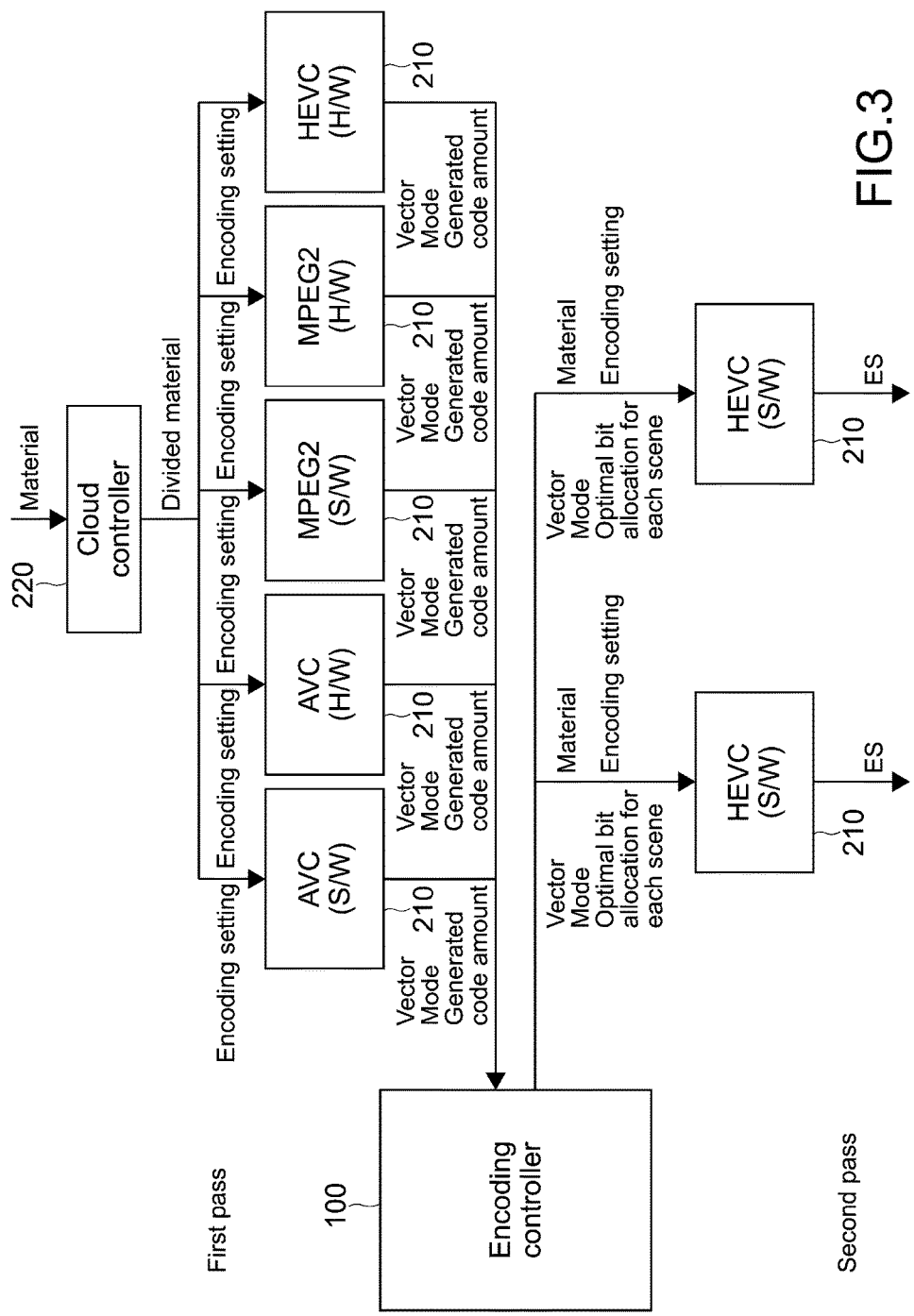
FIG. 3 is a diagram showing a specific example of the authoring encoding system.

FIG. 3 is a diagram showing a specific example of the authoring encoding system.

As shown in the figure, an encoder 210 is installed or incorporated in each encoding apparatus 200. Any of the encoding apparatuses 200 includes a cloud controller 220 that causes each encoder 210 in the cloud to perform encoding processing based on an encoding command (encoding instruction signal) from the encoding controller 100.

However, the cloud controller 220 is not necessarily provided and the encoding controller 100 may be responsible for the function of the cloud controller 220.

The cloud controller 220 divides moving data as an encoding target material for each scene. The cloud controller 220 causes the encoders 210 to encode the divided data under different encoding setting conditions.

The encoders 210 are different encoders. That is, the encoders 210 use different encoding methods. Otherwise, even if the encoders 210 use the same encoding methods, the encoders 210 are distinguished from one another as software or hardware encoders.

In the figure, for example, there are AVC encoders, MPEG2 encoders, and HEVC encoders as the encoders 210 using different encoding methods. In each of these encoders, there are a software encoder and a hardware encoder.

In multi-pass encoding processing, the cloud controller 220 judges, based on results of encoding by the encoders 210 in a first pass, whether or not the image quality has a problem, in other words, whether or not the image quality satisfies a predetermined criteria. If it is judged that the image quality has a problem, the cloud controller 220 transmits information obtained by the encoding, for example, information on an actually generated code amount, a motion vector, a mode, and the like to the encoding controller 100.

The encoding controller 100 sets, based on the information received from the cloud controller 220, an encoding condition different from those in the first pass, and requests the cloud controller 220 to cause at least one encoder 210 to perform encoding processing in a second pass based on the encoding condition.

In the figure, as encoders in the second pass, the software encoders of the HEVC are designated. The encoding processing is repeated until the image quality of the moving data as the result of encoding satisfies the predetermined criteria. If the predetermined criteria is satisfied, the encoded moving data is passed to the subsequent authoring process as an elementary stream (ES).

If it is already judged that the image quality does not have a problem in the first pass, the encoding processing is terminated.

[Database of Encoding Controller]

FIG. 4 is a diagram showing a configuration of a database of the encoding controller 100.

As shown in the figure, the encoding controller 100 stores, for each of the encoding apparatuses 200, information on the type of the encoders of the encoding apparatuses 200 and the arithmetic processing capabilities of the encoding apparatuses 200.

As the arithmetic processing capability, a clock frequency of the CPU and a capability of the memory of each encoding apparatus 200 are stored.

In the example in the figure, an encoding apparatus A is an apparatus having a relatively high arithmetic processing capability (high spec) and includes an HEVC encoder that requires a large calculation amount for encoding processing. An encoding apparatus B is a relatively low arithmetic processing capability (low spec) and includes an MPEG2 encoder that does not require a large calculation amount for encoding processing. An encoding apparatus C has a middle spec between the encoding apparatuses A and B and includes an AVC encoder that requires a calculation amount larger than that of the MPEG2 and smaller than the HEVC for encoding processing.

Such data is used for the encoding controller 100 to set encoding conditions when instructing the encoding apparatuses (encoders 210) to perform encoding processing.

[Operations of System]

Next, an operation of the thus configured system will be described. In the following description, the CPU 11 of the encoding controller 100 is described as a main operation subject. Note that this operation is performed in cooperation with programs executed under the control of the CPU.

Figure 5:
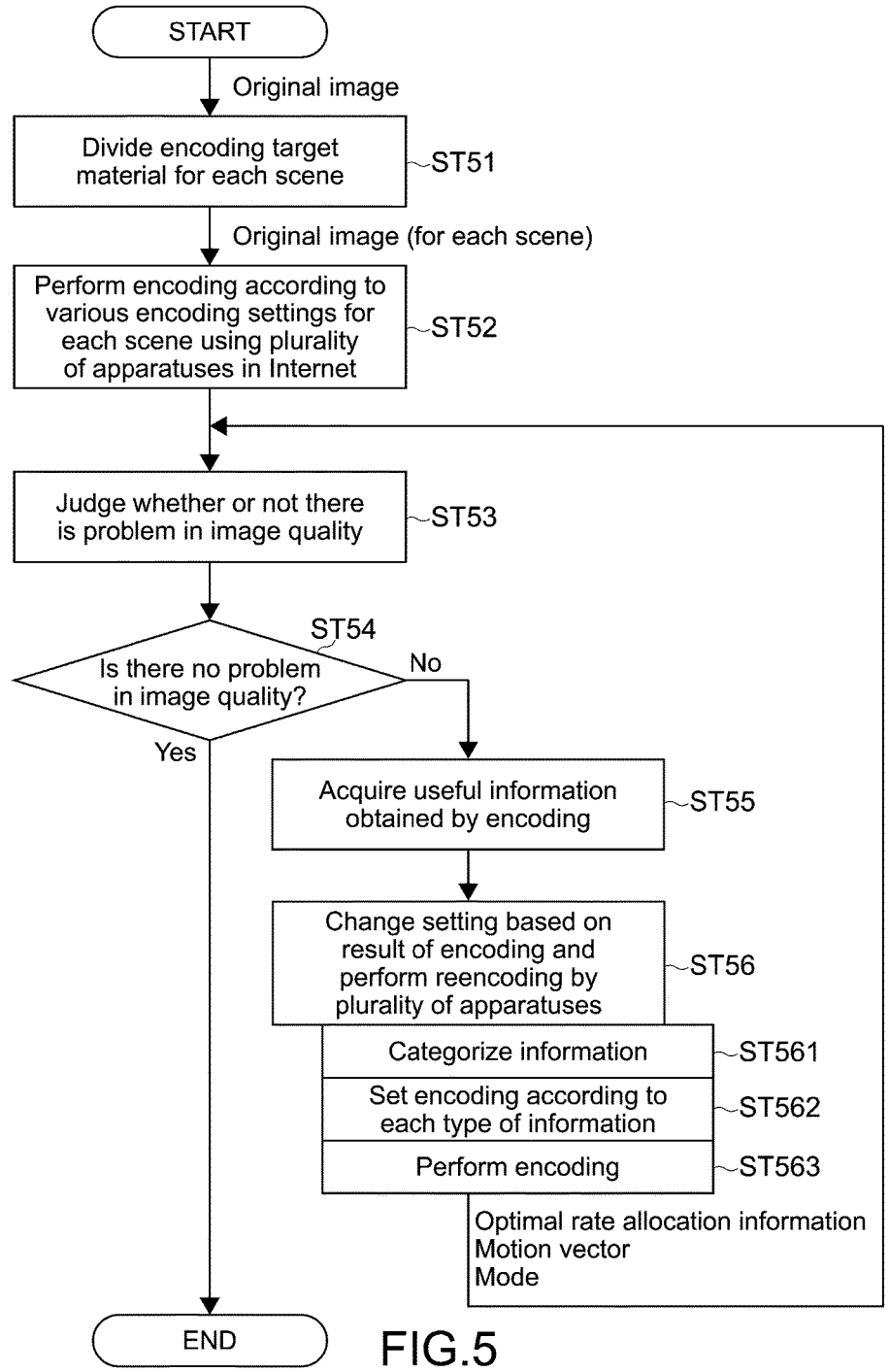
FIG. 5 is a flowchart showing a flow of encoding processing of the encoding controller.

FIG. 5 is a flowchart showing a flow of the encoding processing of the encoding controller 100.

As shown in the figure, the CPU 11 of the encoding controller 100 instructs the cloud controller 220 to divide moving image data as the encoding target for each scene (Step 51). The cloud controller 220 divides the moving image data according to this instruction.

For example, scene change detection algorithm of judging, based on a difference between luminance values, whether or not the scene has been changed is used for the division processing for each scene.

Subsequently, the CPU 11 instructs the cloud controller 220 to perform encoding processing in a first pass under various encoding setting conditions for each scene, using the encoders 210 of the plurality of encoding apparatuses 200 (Step 52).

For the different encoding setting conditions, there are exemplified different encoding methods and different encoding parameters.

As described above, for the different encoding methods, a combination of S/W of MPEG2, H/W of MPEG2, S/W of AVC, H/W of AVC, S/W of HEVC, H/W of HEVC, and the like is exemplified. For different encoding parameters, for example, there are a combination of different bit rates, different groups of pictures (GOPs), and different quantization matrices, a prefilter for dithering, noise reduction, or the like, and the like.

As described above, the encoding controller 100 stores the specs of the plurality of encoding apparatuses 200 and the data on the type of the encoder incorporated or installed in each of the plurality of encoding apparatuses 200.

The encoding controller 100 stores a frame rate of the moving image content as the encoding target in advance and selects, according to the frame rate of the moving image content, a suitable apparatus from among the plurality of encoding apparatuses 200.

For example, if the frame rate of the moving image content as the encoding target is 24P (24 frames/s progressive), the CPU 11 instructs the encoding apparatus 200 having a relatively low spec (e.g., encoding apparatus B in FIG. 4) to perform encoding processing. On the contrary, if the frame rate of the moving image content as the encoding target is 60P, the CPU 11 instructs the encoding apparatus 200 having a relatively high spec (e.g., encoding apparatus A in FIG. 4) to perform encoding processing.

Alternatively, the CPU 11 may select the encoding apparatus 200 according to the setting of the encoding parameter or calculation amount necessary for encoding processing according to this setting.

Figure 6:
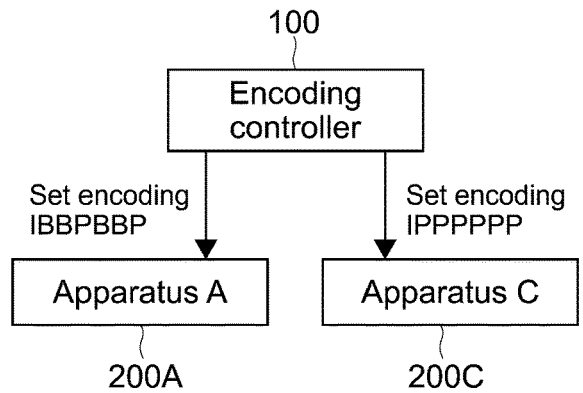
FIG. 6 is a diagram showing a specific example of a dispersive technique of the encoding controller.

FIG. 6 is a diagram showing a specific example of the selection processing of the encoding apparatus 200 according to the setting of the encoding parameter.

As shown in the figure, for example, in the case of performing encoding processing using two settings of IBBPBBP and IPPPPPP as GOP arrangement, the former requires a higher calculation amount for encoding processing. Therefore, for the former, the CPU 11 instructs the encoding apparatus 200 (e.g., encoding apparatus A in FIG. 4) having a relatively high spec to perform encoding processing. For the latter, the CPU 11 instructs the encoding apparatus 200 (e.g., encoding apparatus B in FIG. 4) having a relatively low spec to perform encoding processing.

Subsequently, the cloud controller 220 judges whether or not the image quality of the moving image data as a result of the encoding processing performed by each encoding apparatus 200 in the first pass has a problem (Step 53).

For the judgment of the image quality, for example, an objective evaluation method (method of quantifying high or low image quality) such as feature-similarity (FSIM) and image quality assessment (IQA) or a subjective evaluation method (method of checking it by human eyes) is used. The FSIM has become more popular in recent years because it is an evaluation method having a higher correlation with the subjectivity in comparison with an objective evaluation method using a peak signal-to-noise ratio (PSNR) or the like in the related art.

If it is judged as a result of the evaluation that the image quality has no problem (Yes), in other words, a numerical value satisfying a predetermined image quality criteria has been obtained from a result of encoding performed by any encoder 210, the cloud controller 220 and the encoding controller 100 terminate the encoding processing.

An authoring video encoder in the related art obtains information on an actually generated code amount, a motion vector, a mode, and the like for each scene in the first pass, and thus performs main encoding aiming for homogenizing the image quality in the second pass. In other words, the authoring encoder in the related art performs, in the first pass, just an encoding work for preparing the second pass.

However, in this embodiment, the encoding is performed under various encoding setting conditions at the phase of the first pass, and hence there is a possibility that, due to the encoding processing in the first pass, optimal bit rate allocation for each scene has been already achieved. If this point is confirmed using the evaluation method, the processing in the second pass and the subsequent processing become unnecessary.

Of course, even in this embodiment, assuming that the encoding processing in the first pass is at least performed, the encoding processing in the first pass may be executed for the purpose of obtaining useful information used for the encoding processing in the second pass.

For example, if the encoding method of the moving image data finally authored is the HEVC, an encoder that requires a smaller calculation amount for encoding than in the HEVC, for example, the AVC or the MPEG2 (i.e., high speed encoder) may be used in the first pass. The thus obtained useful information may be substituted for information in the HEVC and used for encoding processing performed by the HEVC in the second pass.

If it is judged as a result of the evaluation that the image quality has a problem (No), the cloud controller 220 transmits the useful information associated with the image quality, which has been obtained in the encoding processing performed by the encoding apparatuses 200, for example, information on the actually generated code amount, the motion vector, a DCT size, types of intra-prediction and mode, and the like, to the encoding controller 100 (Step 55).

The CPU 11 that has received the information obtained from the result of encoding performs optimal bit rate allocation and instructs the cloud controller 220 to cause at least one of the encoding apparatuses 200 to perform encoding again based on the bit rate information and the useful information obtained from the result of encoding in the first pass, that is, under an encoding setting condition different from that in the first pass (Step 56).

At this time, the CPU 11 may set a plurality of combinations of different quantization matrices and GOPs and cause the encoders 210 of the plurality of encoding apparatuses 200 to perform encoding.

The reencoding processing is divided into three steps of categorization of information (Step 561), setting of encoding conditions according to the categorized information items (Step 562), and encoding processing (Step 563).

(Categorization of Information-Step 561)

The CPU 11 judges which of the motion vector, the type of intra-prediction, the type of mode, and the DCT size the information obtained from the encoding processing in the first pass is.

(Setting of Encoding Condition-Step 562)

For example, if the moving image data is encoded by the AVC in the first pass and encoded by the HEVC (having a higher encoding efficiency than that of the AVC) in the second pass, useful information obtained from the AVC (motion vector, DCT size, types of intra-prediction and inter-mode, etc.) can be substituted for that for the HEVC to comply with the HEVC as shown below.

Motion Vector

The motion vector obtained by the encoding processing performed by the AVC cannot be greatly different from that obtained by the HEVC. Therefore, in the second pass, the CPU 11 sets a motion vector search range to search only near the motion vector obtained by the encoding processing performed by the AVC in the first pass and passes this setting information to the encoder 210 used in the second pass via the cloud controller 220.

With this, the encoder 210 used in the second pass searches only the limited range for the motion vector, and hence it is possible to accurately and speedily the motion vector.

DCT Size

The DCT size of the AVC is only 4×4 or 8×8. On the other hand, the DCT size of the HEVC is 4×4, 8×8, 16×16, or 32×32. Unlike the motion vector, the HEVC has DCT sizes that the AVC does not have. However, it is unlikely that, if the DCT size of 4×4 is selected in the AVC, the DCT size of the HEVC becomes 32×32.

Therefore, if the DCT size of 4×4 is selected in the encoding processing performed by the AVC in the first pass, the CPU 11 sets the search size of the DCT in the encoding processing performed by the HEVC in the second pass to be limited to 4×4 or 8×8 and passes this setting information to the encoder 210 used in the second pass via the cloud controller 220.

If the CPU 11 selects the DCT size of 8×8 in the encoding processing performed by the AVC in the first pass, the CPU 11 sets, in the encoding processing performed by the HEVC in the second pass, a size to be limited to the DCT size larger than the DCT size of 8×8, which is 8×8, 16×16, or 32×32, and passes this setting information to the encoder 210 used in the second pass via the cloud controller 220.

With this, the encoder 210 used in the second pass searches for only the limited size, and hence it is possible to accurately and speedily determine the DCT size.

Intra-Prediction

The HEVC has more than four times as many types of intra-prediction as the AVC has. However, it is unlikely that a predicted direction in the HEVC is entirely different from a predicted direction in the AVC. Therefore, the CPU 11 sets a range of intra-prediction to search only near the predicted direction obtained in the encoding processing performed by the AVC in the first pass with the predicted direction being a center, and passes this setting information to the encoder 210 used in the second pass via the cloud controller 220.

With this, the encoder 210 used in the second pass searches only the limited range, and hence it is possible to accurately and speedily determine the intra-prediction.

Inter-Mode.

The HEVC also has more than four times as many types of inter-mode as the AVC has. However, as in the case of the DCT, it is unlikely that, if an Inter 8×8 mode is selected in the encoding processing performed by the AVC, Inter 64×64 is selected in the encoding processing performed by the HEVC.

Therefore, if the mode equal to or larger than Inter 8×8 is selected in the encoding processing performed by the AVC in the first pass, the CPU 11 sets the inter-mode range to select an optimal mode from the limited modes equal to or larger than Inter 8×8 also in the encoding processing performed in the HEVC of the second pass. The CPU 11 passes this setting information to the encoder 210 used in the second pass via the cloud controller 220.

With this, the encoder 210 of the second pass searches for the limited modes, and hence it is possible to accurately and speedily determine the inter-mode.

(Encoding-Step 563)

Then, the cloud controller 220 controls the encoder 210 to perform encoding under the encoding setting condition as exemplified above.

Subsequently, the cloud controller 220 further judges whether or not there is a problem in the image quality of the moving image data as the result obtained by the encoding processing performed by the encoder 210 in the second pass, using the objective evaluation method such as the IQA and the FSIM or the subjective evaluation method (Step 53).

If it is judged as a result of the evaluation that there is no problem in the image quality (Yes), the cloud controller 220 and the encoding controller 100 terminate the encoding processing.

If it is judged that there is a problem in the image quality (No), the cloud controller 220 passes again the useful information obtained by the encoding in the second pass, for example, the actually generated code amount, the motion vector, the mode, and the like to the encoding controller 100.

The loop processing (Steps 53 to 55) is repeated until the image quality of the encoded moving image data is satisfied.

Figure 7:
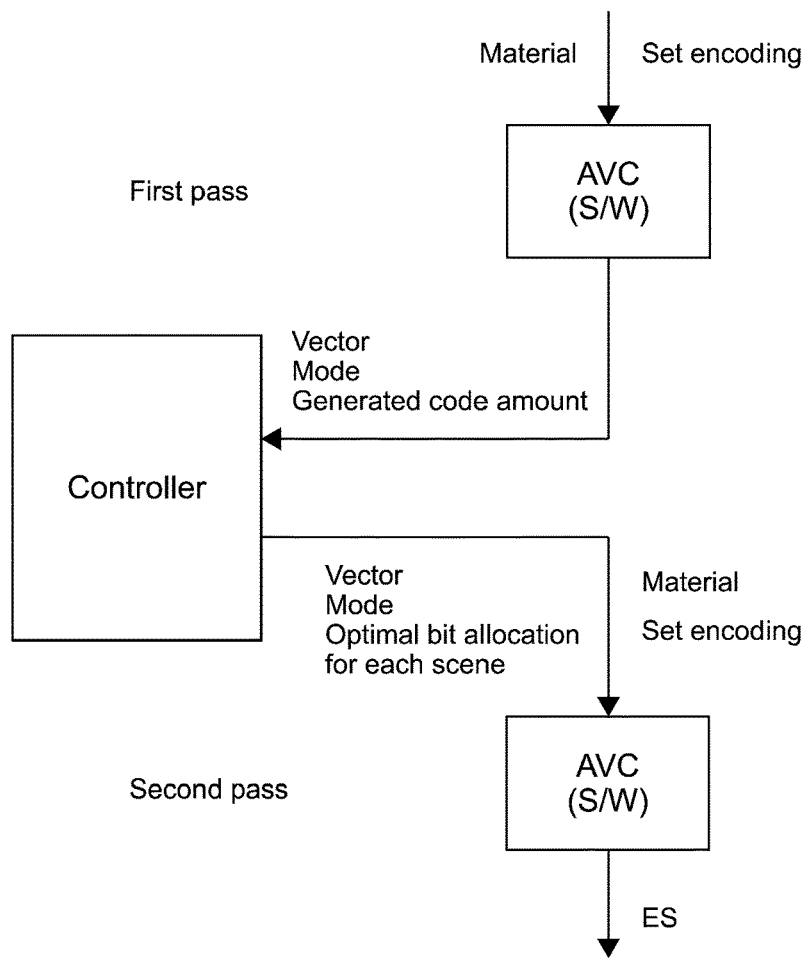
FIG. 7 is a diagram showing a configuration of an authoring encoding system without a plurality of encoders.

FIG. 7 is a diagram showing a configuration of an authoring encoding system without the plurality of encoders for comparison with this embodiment.

As shown in the figure, if the multi-pass encoding processing is performed by only one encoder (e.g., AVC software encoder in figure), the controller needs to repeatedly change the encoding setting condition over many passes until the predetermined image quality criteria is satisfied. Thus, the calculation amount increases and the encoding time becomes too long.

However, according to this embodiment, the encoding controller 100 performs the multi-pass encoding processing by the plurality of encoders 210 under various encoding conditions. Thus, the encoding speed is greatly improved and it is possible to provide the user with a high-quality moving image that has not been provided in various applications.

For example, regarding content that requires immediate encoding such as video of a sport such as a soccer or a live concert such as an outdoor concert, the image quality has been sacrificed in some degrees for the purpose of increasing the encoding speed and immediately providing the content to the user in the related art.

However, in accordance with this embodiment, the encoding speed can be greatly improved, and hence the encoding controller 100 is capable of immediately providing the user with the content having an image quality higher than ever before.

Modified Example

The present technology is not limited to the above-mentioned embodiments and various modifications can be made without departing from the present technology.
(Application to 4K Video)

Encoding processing of 4K video content that has been increasing in recent year takes more than four times as long as that of full-HD video content takes. Therefore, when performing encoding processing of the 4K content in a first pass, the encoding controller 100 may cause a plurality of H/W encoders for full HD to dispersively encode the 4K content in units of ¼-region of each frame of the video data and may collect useful information on a motion vector, bit rate allocation for each scene, and the like. In this case, the encoding controller 100 adds and uses the bit rates in units of regions as the collected bit rate.

Alternatively, the encoding controller 100 may further use the information and cause a plurality of S/W encoders to perform encoding. With this, the encoding controller 100 can realize high-speed encoding by limiting a motion vector search range, mode selection candidates, or the like, and also realize an enhancement in image quality of the 4K video in a shorter time in comparison with the case where a single encoder encodes the 4K video, by performing optimal rate control using bit rate allocation prediction or the like for each scene.

(Remake of Existing Content by Method Having High Encoding Efficiency)

Although the HEVC has a high encoding efficiency, many encode tools are used and encoding processing of the HEVC typically takes more than 100 times as long as the AVC takes. Therefore, the encoding controller 100 may decode a stream of existing content of a blue-lay disc (BD) or the like, collect useful information on the motion vector, the mode, the bit rate allocation for each scene, and the like, and cause the plurality of encoders 210 to dispersively perform software encoding using the useful information.

With this, the encoding controller 100 can realize higher-speed encoding in comparison with HEVC encoding by a single encoder, by limiting a motion vector search range, mode selection candidates, or the like, and at the same time realize an enhancement in image quality of the existing content by performing optimal rate control using bit rate allocation prediction or the like for each scene.

Other Modified Examples

In the above-mentioned embodiments, the encoders 210 incorporated or installed in the encoding apparatuses 200 are different from one another (S/W and H/W of MPEG2, AVC, and HEVC). However, even if the encoders 210 are the same between the encoding apparatuses 200, in this case, even if the plurality of encoders 210 are the same, different encoding conditions (encoding parameters) are set, and hence the same effects as those in the above-mentioned embodiment can be realized.

In the above-mentioned embodiments, the encoding apparatuses 200 are provided in the Internet 50. However, the encoding apparatuses 200 may be provided in a LAN of an authoring studio, for example. Alternatively, the encoding apparatuses 200 may be provided in both of the Internet 50 and the authoring studio. In this case, the encoding controller 100 of the authoring studio may cause a large number of encoding apparatuses 200 in the Internet 50 to perform the encoding processing in the first pass or may cause a small number of encoding apparatuses 200 in the authoring studio to perform the encoding processing in the second pass based on information obtained in the encoding processing.

In the above-mentioned embodiments, the encoding controller 100 and the cloud controller 220 are separately provided. However, without the cloud controller 220, the encoding controller 100 may be responsible for the function thereof. That is, the encoding controller 100 may directly transmit the encoding command to the plurality of encoding apparatuses 200 (encoders 210) via the cloud controller 220.

In the above-mentioned embodiments, the encoding controller 100 and the encoding apparatuses 200 (encoders 210) are separately provided, and hence the encoders 210 do not need to be dispersed in a plurality of apparatuses. That is, the encoding controller 100 may include the plurality of encoders 210 or the apparatus different from the encoding controller 100 may include the plurality of encoders 210.

[Others]

The present technology may also take the following configurations.

(1) An information processing apparatus, including: a storage unit configured to store information on a plurality of encoders; and a control unit configured to be capable of transmitting a first instruction signal for instructing the plurality of encoders to encode input video data under first encoding conditions different for each of the plurality of encoders, and obtaining, if an image quality of the video data encoded by the plurality of encoders does not satisfy a predetermined criteria, predetermined information associated with the image quality from the encoded video data and transmitting, based on the predetermined information, a second instruction signal for instructing to encode the input video data under a second encoding condition different from the first encoding conditions to at least one encoder of the plurality of encoders.

(2) The information processing apparatus according to (1), in which
the plurality of encoders are provided in a plurality of apparatuses in a network, the information processing apparatus further including
a communication unit capable of transmitting the first instruction signal to the encoder of each of the plurality of apparatuses.

(3) The information processing apparatus according to (2), in which
the plurality of apparatuses have different arithmetic processing capabilities, and
the control unit is configured to control the communication unit to transmit the first instruction signal for instructing to perform encoding under an encoding condition having a first calculation amount out of the first encoding conditions to a first apparatus having a first arithmetic processing capability and transmit the first instruction signal for instructing to perform encoding under an encoding condition having a second calculation amount smaller than the first calculation amount out of the first encoding conditions to a second apparatus having a second arithmetic processing capability lower than the first arithmetic processing capability.

(4) The information processing apparatus according to any one of (1) to (3), in which
the control unit is configured to set encoding using different first encoding parameters by a first encoding method having a first encoding efficiency as the first encoding conditions and set, based on the predetermined information obtained by the encoding by the first encoding method, encoding using a second encoding parameter by a second encoding method having a second encoding efficiency higher than the first encoding efficiency as the second encoding condition.
(5) The information processing apparatus according to any one of (1) to (4), in which
the control unit is configured to set the first encoding conditions such that a plurality of regions in each frame of the input video data are encoded by different encoders and to transmit the first instruction signal.
(6) The information processing apparatus according to any one of (1) to (5), in which
the input video data is video data obtained by decoding video data encoded by a first encoding method having a first encoding efficiency, and
the control unit is configured to set, based on the predetermined information obtained from the video data encoded by the first encoding method, encoding parameters of a second encoding method different from the first encoding method as the first encoding conditions, the encoding parameters being different for each of the encoders.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing apparatus, comprising:
a storage unit configured to store information for a plurality of encoders; and
one or more processors configured to:
transmit a first instruction signal to instruct the plurality of encoders,
wherein the plurality of encoders encode first video data, based on first encoding conditions and the first instruction signal, and
wherein the first encoding conditions are different for each of the plurality of encoders;
obtain, based on a determination that a value of an image quality of the encoded first video data is less than a first value, first information associated with the image quality from the encoded first video data; and
transmit, based on the obtained first information, a second instruction signal to instruct at least one encoder of the plurality of encoders to re-encode the first video data,
wherein the at least one encoder of the plurality of encoders re-encodes the first video data, based on a second encoding condition different from the first encoding conditions and the second instruction signal.
2. The information processing apparatus according to claim 1,
wherein the plurality of encoders are in a plurality of apparatuses in a network, and
wherein the one or more processors are further configured to control the transmission of the first instruction signal to an encoder of each of the plurality of apparatuses.
3. The information processing apparatus according to claim 2,
wherein the plurality of apparatuses have different arithmetic processing capabilities,
wherein the first encoding conditions include a third encoding condition for a first apparatus of the plurality of apparatuses and a fourth encoding condition for a second apparatus of the plurality of apparatuses, and
wherein the one or more processors are further configured to:
control the transmission of the first instruction signal, to instruct:
the first apparatus of the plurality of apparatuses to encode the first video data based on the third encoding condition,
the second apparatus of the plurality of apparatuses to encode the first video data based on the fourth encoding condition,
wherein the third encoding condition includes a first calculation amount to encode the first video data,
wherein the first apparatus has a first arithmetic processing capability,
wherein the fourth encoding condition includes a second calculation amount, which is smaller than the first calculation amount, to encode the first video data, and
wherein the second apparatus has a second arithmetic processing capability lower than the first arithmetic processing capability.
4. The information processing apparatus according to claim 1,
wherein the one or more processors are further configured to:
set the first encoding conditions that include first encoding parameters and a first encoding efficiency; and
set the second encoding conditions that include second encoding parameters and a second encoding efficiency,
wherein the second encoding parameters of the second encoding conditions are based on the obtained first information, and
wherein the second encoding efficiency is higher than the first encoding efficiency.
5. The information processing apparatus according to claim 1, wherein the one or more processors are further configured to:
set the first encoding conditions such that a plurality of regions in each frame of the first video data are encoded by different encoders of the plurality of encoders.
6. The information processing apparatus according to claim 1, wherein the one or more processors are further configured to:
decode second video data that is encoded by a first encoding operation with a first encoding efficiency;
obtain the first video data, based on the decoded second video data; and
set, based on second information obtained from the second video data, encoding parameters of a second encoding operation as the first encoding conditions,
wherein the second encoding operation is different from the first encoding operation, and
wherein the encoding parameters are different for each of the plurality of encoders.
7. An information processing system, comprising:
a plurality of apparatuses,
wherein each apparatus of the plurality of apparatuses include an encoder that is configured to encode data based on different encoding conditions; and an information processing apparatus including:
  a storage unit configured to store information for the encoder of each of the plurality of apparatuses; and
  one or more processors configured to:
    transmit a first instruction signal to instruct a plurality of encoders of the plurality of apparatuses,
      wherein the plurality of encoders encode first video data, based on first encoding conditions and the first instruction signal, and
      wherein the first encoding conditions are different for each of the plurality of encoders;
    obtain, based on a determination that a value of an image quality of the encoded first video data is less than a first value, first information associated with the image quality from the encoded first video data; and
    transmit, based on the obtained first information, a second instruction signal to instruct at least one encoder of the plurality of encoders to re-encode the first video data,
      wherein the at least one encoder of the plurality of encoders re-encodes the first video data, based on a second encoding condition different from the first encoding conditions and the second instruction signal.

8. An information processing method, comprising:
in an information processing apparatus:
transmitting a first instruction signal for instructing a plurality of encoders,
  wherein the plurality of encoders encode first video data, based on first encoding conditions and the first instructions signal, and
  wherein the first encoding conditions are different for each of the plurality of encoders;
obtaining, based on a determination that a value of an image quality of the encoded first video data is less than a first value, first information associated with the image quality from the encoded first video data; and
transmitting, based on the obtained first information, a second instruction signal for instructing at least one encoder of the plurality of encoders to re-encode the first video data,
  wherein the at least one encoder of the plurality of encoders re-encodes the first video data, based on a second encoding condition different from the first encoding conditions and the second instruction signal.

9. A non-transitory computer-readable medium, having stored thereon computer-executable instructions, which when executed by a processor, cause the processor to execute operations, the operations comprising:
transmitting a first instruction signal for instructing a plurality of encoders,
  wherein the plurality of encoders encode first video data, based on first encoding conditions and the first instruction signal, and
  wherein the first encoding conditions are different for each of the plurality of encoders;
obtaining, based on a determination that a value of an image quality of the encoded first video data is less than a first value, first information associated with the image quality from the encoded first video data; and
transmitting, based on the obtained first information, a second instruction signal for instructing at least one encoder of the plurality of encoders to re-encode the first video data,
  wherein the at least one encoder of the plurality of encoders re-encodes the first video data, based on a second encoding condition different from the first encoding conditions and the second instruction signal.

* * * * *